(12) United States Patent
Pollock et al.

(10) Patent No.: US 6,901,881 B2
(45) Date of Patent: Jun. 7, 2005

(54) TWO-STAGE DRINKER FOR A POULTRY WATERING SYSTEM

(75) Inventors: Eugene B. Pollock, Assumption, IL (US); James M Adermann, Altamont, IL (US)

(73) Assignee: The GSI Group, Inc., Assumption, IL (US)

( * ) Notice: Subject to any disclaimer, the term of this patent is extended or adjusted under 35 U.S.C. 154(b) by 0 days.

(21) Appl. No.: 10/673,694

(22) Filed: Sep. 29, 2003

(65) Prior Publication Data
US 2005/0066907 A1 Mar. 31, 2005

(51) Int. Cl.[7] ............................................. A01K 7/00
(52) U.S. Cl. ...................................... 119/72.5; 119/75
(58) Field of Search ........................... 119/72.5, 75, 72, 119/51.5

(56) References Cited

U.S. PATENT DOCUMENTS

| | | | |
|---|---|---|---|
| 1,168,933 A | 1/1916 | Burkley et al. | |
| 1,310,320 A | 7/1919 | Bogda | |
| 1,454,284 A | 5/1923 | Holmes | |
| 1,916,513 A | 7/1933 | Jones | |
| 2,851,007 A | 9/1958 | Kagan | |
| 3,416,499 A | * 12/1968 | Wilmot | 119/72.5 |
| 3,566,844 A | 3/1971 | Occhiodori et al. | |
| 3,602,197 A | 8/1971 | Fioretto | |
| 3,669,077 A | 6/1972 | Spierenburg | |
| 3,716,030 A | 2/1973 | Godshalk et al. | |
| 3,750,628 A | 8/1973 | Schumacher | |
| 3,756,199 A | 9/1973 | Clark, IV | |
| 4,284,036 A | 8/1981 | Hostetler | |
| 4,491,088 A | 1/1985 | Hostetler | |
| 4,524,724 A | 6/1985 | Steudler, Jr. | |
| 4,589,373 A | 5/1986 | Hostetler et al. | |
| 4,606,301 A | 8/1986 | Steudler, Jr. | |
| 4,610,221 A | 9/1986 | Steudler, Jr. | |
| 4,637,345 A | 1/1987 | Hostetler | |
| 4,660,509 A | 4/1987 | Steudler, Jr. | |
| 4,890,578 A | * 1/1990 | Rader | 119/72.5 |
| 4,984,537 A | 1/1991 | Steudler, Jr. | |
| 5,074,250 A | 12/1991 | Clark | |
| 5,193,485 A | 3/1993 | Hostetler | |
| 5,222,462 A | 6/1993 | Steudler, Jr. | |
| 5,293,836 A | 3/1994 | Hostetler | |
| 5,301,635 A | * 4/1994 | Rovira Badia et al. | 119/72.5 |
| 5,327,853 A | 7/1994 | Hostetler | |

(Continued)

Primary Examiner—Yvonne R. Abbott
(74) Attorney, Agent, or Firm—Polster, Lieder, Woodruff & Lucchesi, L.C.

(57) ABSTRACT

A drinker for a watering system of a poultry house comprising a housing having a side wall, a top, and a bottom defining a valve chamber having an inner surface and a floor. A valve seat is formed in the chamber above the outlet port; and a valve member received within the chamber to be movable between a first closed position and a second position opened position. A trigger pin passes through the outlet and has a head with a cavity in the top surface. The cavity has a shape different from the shape of the valve member. The drinker elements are sized such that the distance between the valve seat and the chamber floor is greater than the height of the pin head. Additionally, the valve member is sized such that when the valve member is in its closed position, the valve member is does not contact the pin head.

9 Claims, 4 Drawing Sheets

U.S. PATENT DOCUMENTS

| | | |
|---|---|---|
| 5,329,877 A | 7/1994 | Schumacher |
| 5,522,346 A | 6/1996 | Clark, IV |
| 5,628,278 A | 5/1997 | Uri |
| 5,660,139 A | 8/1997 | Hostetler |
| 5,765,506 A | 6/1998 | Hawk et al. |
| 5,996,530 A | 12/1999 | Miller et al. |
| 6,073,584 A | 6/2000 | Schumacher |
| 6,308,657 B1 | 10/2001 | Schumacher et al. |
| 2003/0079692 A1 | 5/2003 | Steudler, Jr. et al. |

\* cited by examiner

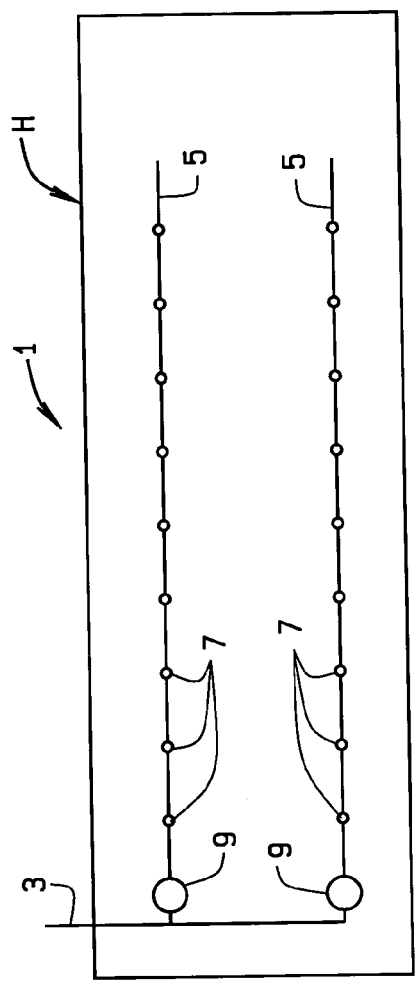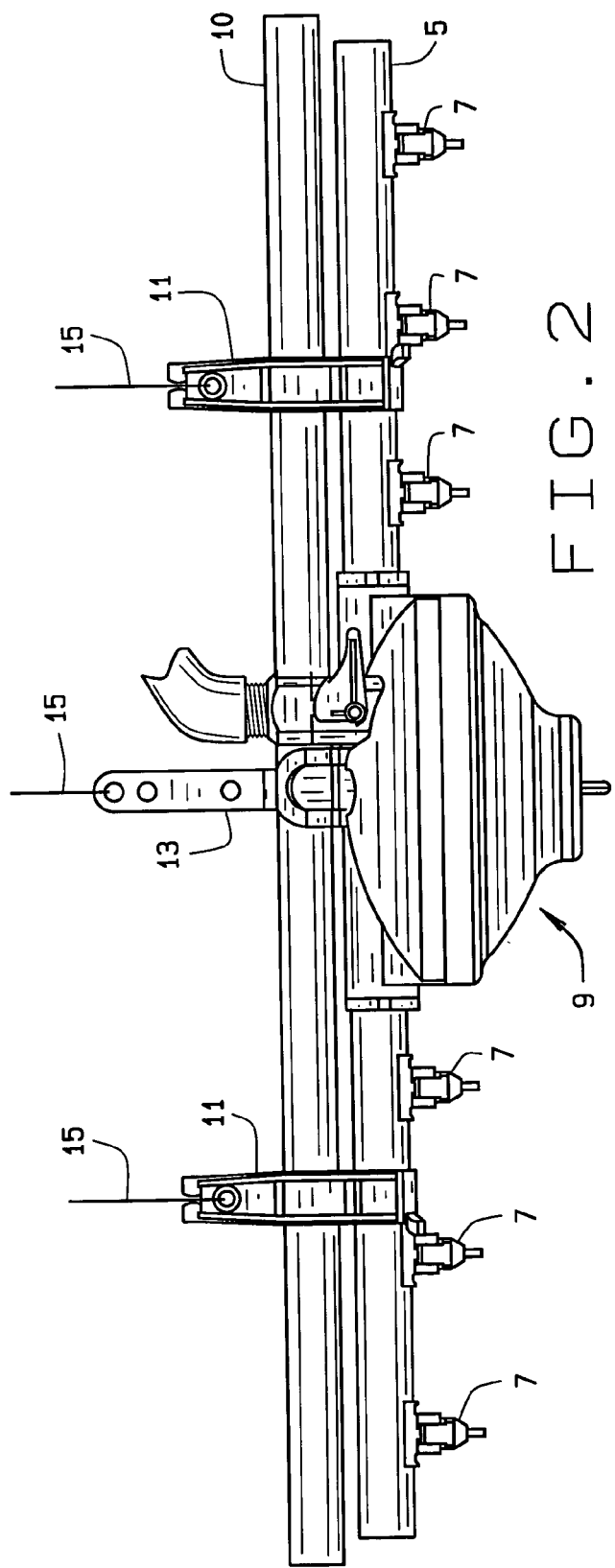

TWO-STAGE DRINKER FOR A POULTRY WATERING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to watering systems for use in a poultry house, and, in particular, to an improved two-stage drinker for use in the watering system.

A typical watering system for a poultry house includes a water regulator which is connected to a supply of water to reduce the line pressure of the supply water. Watering lines extend from the regulator and drinkers depend from the bottom of the watering lines. Currently existing drinkers include a housing having a ball valve which is operated by a pin. When the chicken pecks at the pin, the pin moves the ball valve off its seat, to allow water to pass through the drinker, allowing the chicken to have water.

A persistent problem with drinkers has been leakage caused by the inability for the ball to fully engage the valve seat in the drinker housing. The leakage plaguing currently available drinkers comes from the fact that the design of the currently available drinkers requires the components of the drinker to fit within tight tolerance limits. It would be desirable to produce a drinker which does not require such tight tolerances and which will substantially reduce the leakage problem.

BRIEF SUMMARY OF THE INVENTION

Briefly stated, a drinker for a watering system of a poultry house; the drinker comprising a housing having a side wall, a top, and a bottom defining a valve chamber having an inner surface and a floor. The chamber has in inlet an inlet to place the drinker chamber in communication with a supply of water and an outlet port extending through the bottom of the housing to allow water to exit the housing. The outlet port is defined by a wall which slopes outwardly, such that the diameter at the bottom of the outlet port is larger than the diameter at the top of the outlet port. A valve seat is formed in the chamber above the outlet port; and a valve member received within the chamber. The valve member is movable between a first position in which the valve member engages the valve seat to close the outlet port to prevent the flow of water through the drinker and a second position in which the valve member is raised relative to the valve seat to open the outlet port to allow water to pass through the drinker.

A trigger pin has a shaft which through the outlet port and a head on the top of the shaft which is sized to rest on the chamber floor. Additionally, a cavity of formed in the top of the pin head. The cavity has a shape different from the shape of the valve member. In a preferred embodiment, the valve member is a ball and the cavity is generally cylindrical. The pin if pivotally moveable relative to the housing. Thus, when the pin is pivoted, the peripheral edge of the cavity engages the valve member to move the valve member from the closed position to the opened position.

Preferably, the distance between the valve seat and the chamber floor is greater than the height of the pin head. Additionally, the valve member is sized such that when the valve member is in its closed position, the valve member is does not contact the pin head. Hence, the pin will not interfere with the closure of the drinker.

BRIEF DESCRIPTION OF THE SEVERAL VIEWS OF THE DRAWINGS

FIG. 1 is a diagrammatic view of a poultry house having a watering system including a pressure regulator which supplies low pressure water to an elongate watering pipe having a series of drinking stations or drinkers spaced therealong;

FIG. 2 is an elevational view of watering system with a centrally located regulator, a watering pipe, and drinkers mounted to the underside of the watering pipe

Corresponding reference numerals will be used throughout the several figures of the drawings.

DETAILED DESCRIPTION OF THE INVENTION

Figure 3:
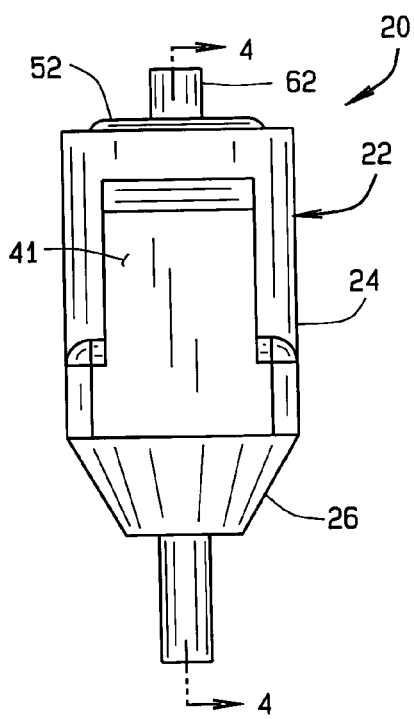
FIG. 3 is a front elevational view of a drinker of the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A watering system 1 for use in a poultry house H is shown schematically in FIG. 1. The watering system 1 includes a water supply pipe 3 which is connected to watering pipes 5, two of which are shown. A regulator 9 is positioned at the start of each of the watering pipes to reduce the line pressure.

A plurality of watering stations or drinkers 7 are spaced along each watering pipe 5. A support or stiffening member 10 (e.g., a support pipe) is suspended from the roof rafters of the poultry house H by cables 15. The regulator 9 and water pipes 5 are carried by the support pipe. Hangers 11 and a bracket 13 suspend the water pipe 5 and regulator 9, respectively, from the support pipe 10. Hangers 11 clampingly grip both support pipe 10 and watering pipe 5 at spaced locations therealong and thus transfer shear loads therebetween thus substantially stiffening the watering system. The bracket 13 and the regulator 9 are preferably as shown in Published Application No. 2003-0111019, now U.S. Pat. No. 6,712,021, which is incorporated herein by reference.

Cables 15 (see FIG. 2) attached to the brackets 11 and 13 suspend the support pipe 11 from the roof trusses or the like of house H. Typically, cables 15 are part of a motorized winch and cable assembly that when selectively operated allows the drinking system to be raised and lowered. The cables are spaced at desired intervals (e.g., 5–15 feet) so as to suspend the support pipe 10 and regulator 9 in the poultry house H without undue deflection of either the support pipe 10 or the watering pipe 5. As will be understood by those skilled in the art, the cables are adjustable in the conventional manner so that the watering pipe 5 is substantially level along its length. It will be understood that the term cable refers generically to any member that may be used to suspend the water system from the roof structure of a poultry house. Such tension suspension members could include wire cables, chains, ropes, wires, rods, links or the like.

Figure 5:
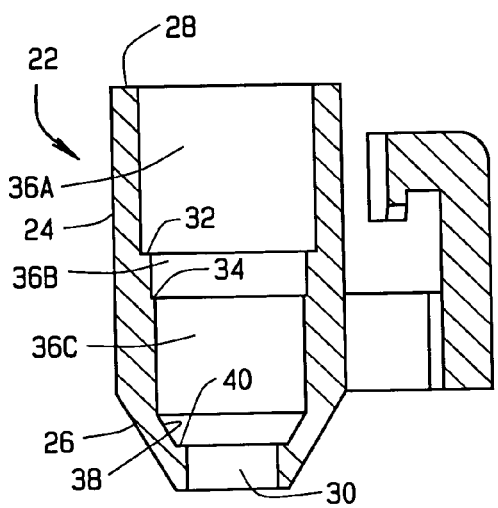
FIG. 5 is a cross-sectional view of a housing for the drinker.

An illustrative example of a preferred drinker 20 is shown generally in FIG. 3. The drinker 20 includes a housing 22 shown in detail in FIG. 5. The housing 22 has an upper generally cylindrical side wall 24 and a lower sidewall 26 which slopes inwardly. The housing is open at its top 28 and has a bottom opening 30. The inner surface of the housing is stepped as at 32 and 34 to define three different sections 36A–C of the chamber formed by the housing walls 24 and 26. At the bottom chamber section 36C, the inner surface slopes, as at 38 to a shoulder 40. The shoulder 40 surrounds the bottom opening 30. A generally C-shaped attachment member 41 extends from the housing side wall 24 to mount the drinker 20 to the water pipe 5. Such an attachment member is shown and described in more detail in U.S. Pat. No. 5,522,346, which is incorporated herein by reference.

Figure 6:
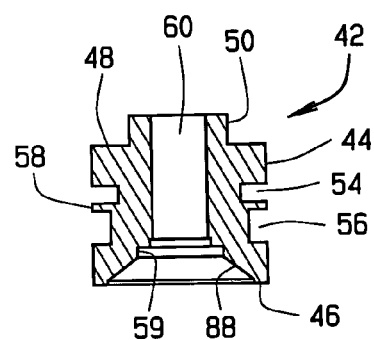
FIG. 6 is a cross-sectional view of a valve cap for the drinker.

A valve cap 42 (shown in detail in FIG. 6) is received in the chamber section 36A. The cap 42 has a side wall 44, a lower surface 46, and an upper surface 48. The side wall 44 has a diameter sized such that the cap 42 will be frictionally received within the housing chamber 36A. A post 50 extends up from the upper surface 48, at the center thereof, to define a rabitted channel to receive an O-ring 52. The cap 42 is sized such that its bottom surface 46 rests on the housing shoulder 32 and the top of the post 50 is approximately flush with the housing top surface 28. As can be appreciated, the O-ring 52 forms a liquid tight seal between the cap 42 and the housing 22. Additional grooves 54 and 56 are formed in the side wall 44. The grooves 54 and 56 define a ring 58. The groove 56 is approximately twice as tall as the groove 54. The ring 58 has an outer diameter slightly larger than the outer diameter of the wall 44 to be essentially equal to the inner diameter of the housing chamber 36A. The ring 58 thus positively engages the inner surface of the housing chamber 36A when the valve cap is inserted into the housing to increase the frictional engagement of the valve cap with the housing inner surface. The two grooves 54 and 56 could also receive additional O-rings, if desired. However, because the drinkers are operated at a low water pressure, additional seals are not necessary. The valve cap lower surface 46 is relieved to form a truncated generally conical area 58 having a generally cylindrical portion 59 at the upper end of the conical area 58. A bore 60 extends from the top of the conical area 59 axially through the valve cap, and opens at the top surface of the valve cap.

Figure 8:
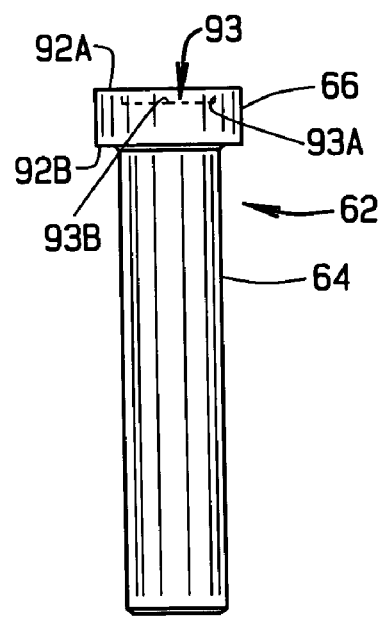
FIG. 8 is an enlarged elevational view of a pin for the drinker.

A pin 62 (FIG. 8) extends through the bore 60. The pin 62 has a shaft 64 and a head 66. The pin head shaft 64 has a diameter sized so that the shaft 64 can slide within the valve cap bore 60. The pin head 66 has a diameter greater than that of the valve cap bore and is received in the cap recessed area 58. Hence, the pin head 66 will prevent the pin 62 from being pushed upwardly out of the bore 60.

Figure 4:
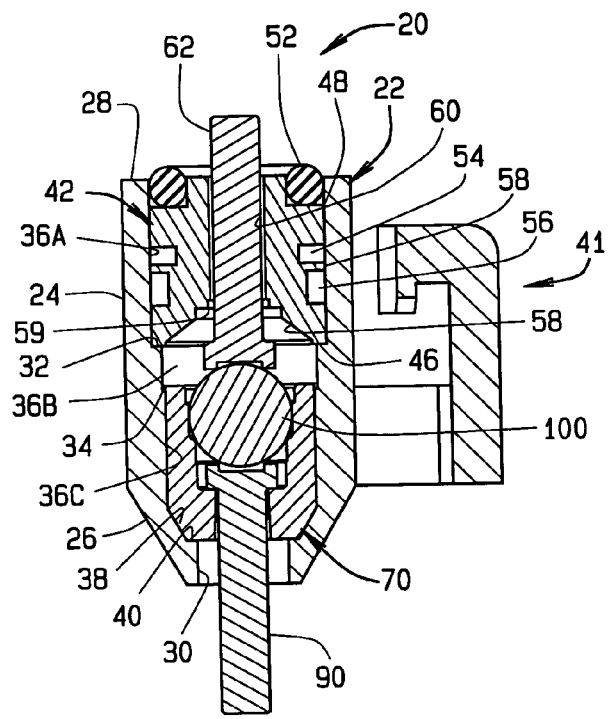
FIG. 4 is a cross-sectional view of the drinker taken along line 4—4 of FIG. 3.
Figure 7:
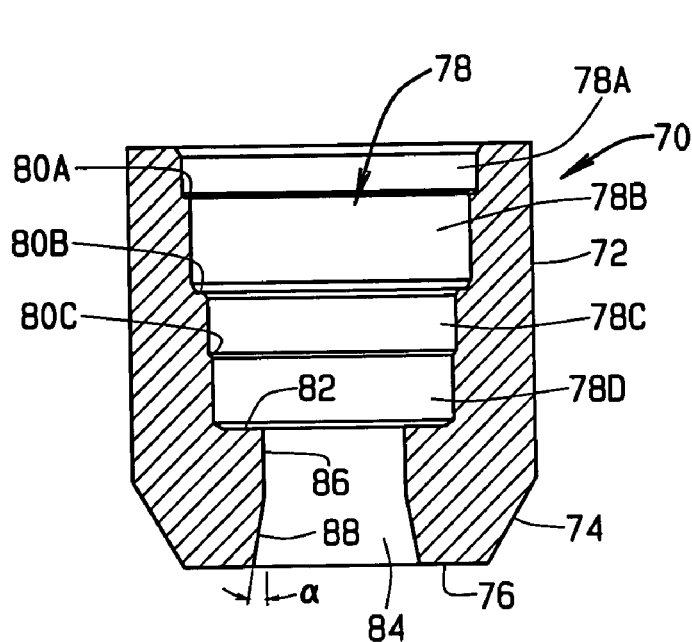
FIG. 7 is an enlarged cross-sectional view of an insert for the drinker.

An insert or cup 70 (shown in more detail in FIG. 7) is received in the lower portion 36C of the housing chamber. The cup 70 has an outer surface shaped to be frictionally received in the house chamber portion 36C. The cup has an outer wall surface 72 which is generally cylindrical. A sloped side surface 74 extends from the bottom of the wall surface 72 to the bottom surface 76 of the cup 70. When received in the housing 22, the cup bottom surface 76 rests on the housing shoulder 40, and the upper surface of the cup is level with, or slightly above, the lower step 34 of the housing chamber, such that the cup 70 is substantially received in the housing chamber portion 36C, as seen in FIG. 4.

Internally, the cup 70 defines a chamber 78 that is generally cylindrical and which has a floor 82 at the bottom of the chamber. The chamber 78 is stepped, as at 80A, 80B, and 80C, to define ever smaller diameter sections 78A–D to the chamber 78. The change in radius is between the three sections of the chamber is small. In a preferred embodiment, the upper section 78A preferably has a radius of about 0.265"; the second section 78B preferably has a radius of about 0.253"; the third section 78C preferably has a radius of about 0.226"; and the fourth section preferably has a radius of about 0.220". Hence, the steps 80A–C define shoulders having annular widths of about 0.012", 0.027", and 0.006". Additionally, the chamber sections 78A–D preferably have heights of about 0.0460", 0.0750", 0.0690", and 0.0665", respectively. Preferably, the steps 80A–C are slightly radiused.

An opening 84 extends through the bottom of the cup, from the cup chamber floor 82 to the cup bottom surface 76. As seen in FIG. 4, the cup opening 84 is aligned, and preferably concentric, with the housing bottom opening 30. The cup opening 84 is smaller in diameter than the housing bottom opening. Preferably, the cup opening 84 has a diameter at the cup chamber floor of about 0.135", whereas, the housing opening is about twice that wide. The cup opening is defined by an upper generally cylindrical wall 86 which extends from the chamber floor 82 to a point approximately even with the upper edge of the cup sloped side wall 74. In a preferred embodiment, the wall 86 has a height of about 0.0435". At about that point, the cup opening is defined by a surface 88 that is slopes slightly outwardly, such that the cup opening diameter is greater at the cup bottom surface than at the intersection between the cup outer walls 72 and 74. Preferably, the opening wall 88 defines an angle $\alpha$ of about 6° and has a height of about 0.085".

Figure 8B:
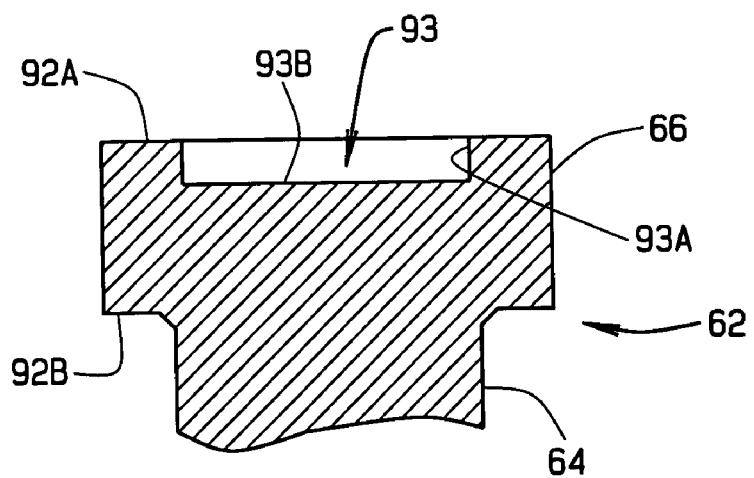
FIG. 8B is a further enlarged cross-sectional fragmentary view of the drinker pin.

A second pin 90 is received in the cup 70. The pin 90, which is shown in more detail in FIG. 8B, is identical to the pin 62 and includes the stem 64 and head 66. The pin head has a diameter greater than the diameter of the cup opening 84 and rests on the cup chamber floor 82 in the assembled drinker. The pin head has an upper surface 92A and a lower surface 92B. A cavity 93 is formed in the head upper surface 92A. The cavity 93, as seen, is preferably generally cylindrical in form, and includes a side wall 93A and a floor or bottom surface 93B. As seen in FIG. 8B, the cavity 93 is generally concentric with the perimeter of the pin head 92. Preferably, the pin head has a height of about 0.067" and a diameter of about 0.178". These parameters give the pin head a height which is very slightly greater than the height of the cup chamber section 78D and a diameter that is substantially less than the diameter of the cup chamber section 78D. The cavity 93 preferably has a depth of about 0.017" and a diameter of about 0.118".

Figure 10:
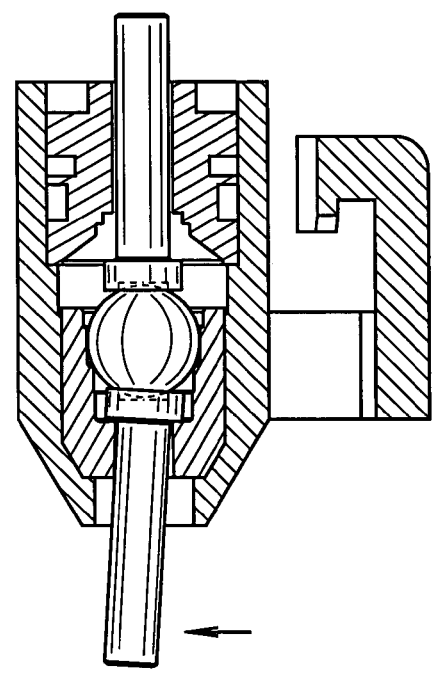
FIG. 10 is a cross-sectional view of the drinker in a first stage, in which water flows through the drinker at a first rate.
Figure 11:
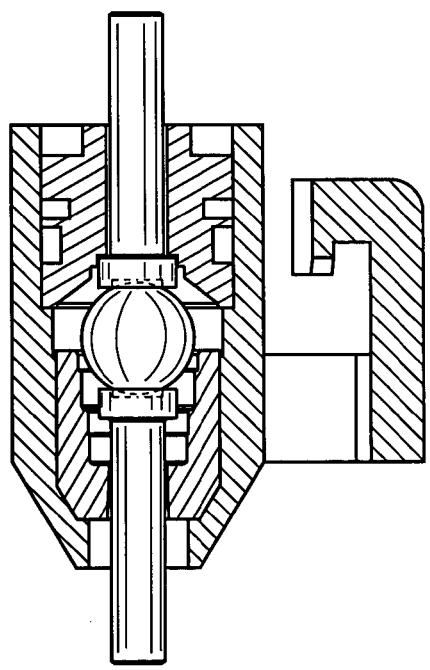
FIG. 11 is a cross-sectional view of the drinker in a second stage, in which water flows through the drinker at a second, faster, rate.

The pin shaft 64 extends downwardly from the pin head and extends through the cup opening 84 and the housing bottom opening 30. The junction of the pin shaft to the pin head is preferably slightly radiused. The pin shaft is generally cylindrical, and thus has a substantially constant diameter over the length of the shaft. Hence, as seen in FIG. 4, the pin shaft has a diameter preferably of about 0.1245" which is slightly less than the diameter of the cup opening 84 at the cup chamber floor. However, because the cup opening increases in diameter, a conical gap is formed between the pin shaft 64 and the cup bottom opening wall 88, as best seen in FIG. 4. This gap allows for the pin to swing or pivot from side to side. When the pin 90 pivots, it pivots about the bottom corner of the pin head, as seen in FIG. 10. Thus, with reference to FIG. 4, if the pin shaft is moved to the left, the pin will pivot about the right side of the pin head. Similarly, if the pin shaft is moved to the right, the pin will pivot about the left side of the pin head.

Lastly, the drinker 20 includes a valve element 100 which is received within the cup chamber 78. Preferably, the valve element is a ball (or sphere) which has a diameter of about 0.25" which is slightly less than the diameter of the cup chamber section 78B and slightly larger than diameter of the cup section 78C, such that the ball 100 sits on the cup chamber shoulder 80B. As can be appreciated, the shoulder 80B defines the valve seat for the drinker.

To assemble the drinker, the cup 70 is inserted into the housing 20, and then the pin 90 and ball 100 are inserted into the cup 70. The valve cap 42, with the pin 62 is then inserted into the housing. The cup is frictionally received in the housing, and the frictional engagement of the valve cap with the housing maintains the valve element and pins within the housing. The assembled drinker 20 can then be mounted to the watering pipe.

Figure 9:
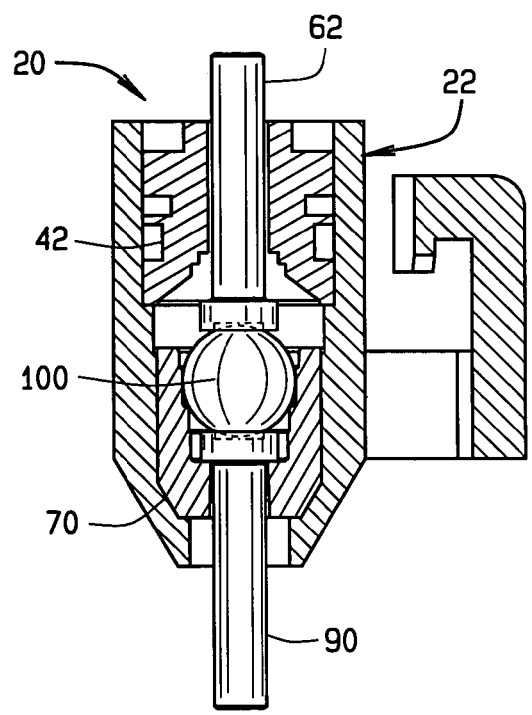
FIG. 9 is a cross-sectional view of the drinker in an idle position, in which water is prevented from passing through the drinker.

As best seen in FIG. 9, when the drinker is in its idle position the valve ball 100 extends into the cavity 98 in the head of the pin 90. However, due to the relative sizes and dimensions of the pin head, the pin head cavity, the diameter of the shoulder 80C (which forms the valve seat for the drinker), and the distance from the chamber floor 82 to the shoulder 80B, the valve element does not contact the pin head when the drinker is in its idle position. Hence, the pin head will not interfere with the seating of the ball 100 on the valve seat or shoulder 80B. This will substantially reduce the possibility of leakage due to a poor seating of the valve member.

In conventionally available drinkers, such as seen in U.S. Pat. Nos. 4,524,724 and 4,598,373 which utilize pins with cavities, the cavities have a curved surface with a curvature conforming to the curvature of the ball. That is, the cavity in the conventionally available drinkers have a radius substantially equal to the radius of the ball. However, in the pin 90, the cavity is cylindrical (i.e., rectangular in cross-section). Due to the shape of the cavity, when a chicken (or other animal) pivots the pin, the ball will be lifted from the perimeter of the cavity, rather than from the center of the cavity as occurs with the pins of conventionally available drinkers. As can be appreciated, as the pin is pivoted, the peripheral edge of the pin cavity will be raised more than the center of the cavity. Hence, even though the pin head is spaced slightly from the valve element, as noted above, the valve element will still be lifted due to pivoting of the pin.

Actually, the drinker is a two stage drinker. When the drinker is in an idle position (i.e., when the ball 100 is sitting on the valve seat 80B) as seen in FIG. 9, no water passes through the drinker. When an animal pivots the pin 90, as seen in FIG. 10, the ball will be raised due to the pivoting of the pin head, as described above, to allow water to pass through the opening in the top of the drinker, through the opening 60 in the cap 42, into the chamber 36B, around the ball 100 and pin 90, and out the openings 30 and 84 in the housing and cup, respectively. At this low flow rate, generally a drop of water is allowed to exit the drinker, and the animal can take the water from the pin 90. Due to the dimension, and especially the height, of the components, the pin 62 is moveable vertically in the drinker housing 22. Hence, rather than moving the pin 90 pivotally, an animal can raise the pin. By raising the pin 90, the ball 100 can be lifter further off the seat 80B, and water can flow at a second, faster, rater through the drinker 20.

As various changes could be made in the above constructions without departing from the scope of the invention, it is intended that all matter contained in the above description or shown in the accompanying drawings shall be interpreted as illustrative and not in a limiting sense.

What is claimed is:

1. A drinker for a watering system of a poultry house; the drinker comprising:

a housing having a side wall, a top, and a bottom defining a valve chamber; the chamber having an inner surface and a floor;

an inlet to place the drinker chamber in communication with a supply of water;

an outlet port extending through the bottom of said housing to allow water to exit said housing; said outlet port being defined by a side wall which slopes outwardly, such that the diameter at the bottom of the outlet opening is larger than the diameter at the top of the outlet opening;

a valve seat in said chamber spaced axially above said outlet port;

a valve member received within said chamber and movable between a first position in which said valve member engages said valve seat to close said outlet port to prevent the flow of water through said drinker and a second position in which said valve member is raised relative to said valve seat to open said outlet port to allow water to pass through said drinker;

a pin extending through said outlet port; said pin having a shaft and a head on said shaft; said head having a circumference greater than said outlet port such that said head rests on said chamber floor; said head further comprising a side wall, an upper surface, and a cavity formed in said upper surface and defined by an edge and a cavity surface; said cavity surface having a shape different from the shape of said valve member;

said pin being pivotally moveable relative to said housing to move said valve member from said closed position to said opened position; whereby, when said pin is pivoted said cavity edges move in an arc to engage said valve member to move said valve member from said closed position to said opened position, the movement of the valve member being dependent upon the amount of movement of the pin cavity edge.

2. The drinker of claim 1 wherein said valve member is a ball.

3. The drinker of claim 2 wherein said pin cavity is generally cylindrical in shape.

4. The drinker of claim 1 wherein the distance between said valve seat and said chamber floor is greater than the height of said pin head; said valve member being sized such that when said valve member is in its closed position, said valve member does not contact said pin head.

5. The drinker of claim 1 including a cup received within said housing; said cup being open at a top and including an inner surface and a floor defining a cup chamber, and an opening in said floor; said cup floor defining said valve chamber floor and said cup chamber defining at least a lower portion of said valve chamber; said cup further including a step in said inner surface spaced above said cup floor; said step defining said valve seat.

6. The drinker of claim 1 wherein said pin is movable both pivotally and vertically, whereby, when said pin is moved pivotally, liquid will pass through said drinker at a first rate and when said pin is moved vertically, liquid will pass through said drinker at a second rate.

7. A drinker for a watering system of a poultry house; the drinker comprising:
 a housing having a side wall, a top, and a bottom defining a valve chamber; the chamber having an inner surface and a floor;
 an inlet to place the drinker chamber in communication with a supply of water;
 an outlet port extending through the bottom of said housing to allow water to exit said housing; said outlet port being defined by a side wall which slopes outwardly, such that the diameter at the bottom of the outlet opening is larger than the diameter at the top of the outlet opening;
 a valve seat in said chamber spaced axially above said outlet port;
 a valve member received within said chamber and movable between a first position in which said valve member engages said valve seat to close said outlet port to prevent the flow of water through said drinker and a second position in which said valve member is raised relative to said valve seat to open said outlet port to allow water to pass through said drinker;
 a pin extending through said outlet port; said pin having a shaft and a head on said shaft; said head having a circumference greater than said outlet port such that said head rests on said chamber floor; said head further comprising a side wall, an upper surface, and a cavity formed in said upper surface and defined by an edge and a cavity surface; said cavity surface having a shape different from the shape of said valve member; said pin being moveable in said housing to move said valve member from said closed position to said opened position;
 wherein the distance between said valve seat and said chamber floor is greater than the height of said pin head; said valve member being sized such that when said valve member is in its closed position, said valve member does not contact said pin head.

8. A drinker for a watering system of a poultry house; the drinker comprising:
 a housing having a side wall, a top, and a bottom defining a valve chamber; the chamber having an inner surface and a floor;
 an inlet to place the drinker chamber in communication with a supply of water;
 an outlet port extending through the bottom of said housing to allow water to exit said housing; said outlet port being defined by a side wall which slopes outwardly, such that the diameter at the bottom of the outlet opening is larger than the diameter at the top of the outlet opening;
 a valve seat in said chamber spaced axially above said outlet port;
 a valve member received within said chamber and movable between a first position in which said valve member engages said valve seat to close said outlet port to prevent the flow of water through said drinker and a second position in which said valve member is raised relative to said valve seat to open said outlet port to allow water to pass through said drinker;
 a pin extending through said outlet port; said pin having a shaft and a head on said shaft; said head having a circumference greater than said outlet port such that said head rests on said chamber floor; said head further comprising a side wall, an upper surface, and a cavity formed in said upper surface and defined by an edge and a cavity surface; said cavity surface having a shape different from the shape of said valve member; said pin being pivotally moveable in said housing to move said valve member from said closed position to said opened position; whereby, when said pin is pivoted said cavity edges move in an arc to engage said valve member to move said valve member from said closed position to said opened position, the movement of the valve member being dependant upon the amount of movement of the pin cavity edge; and
 wherein the distance between said valve seat and said chamber floor is greater than the height of said pin head; said valve member being sized such that when said valve member is in its closed position, said valve member does not contact said pin head.

9. The drinker of claim 8 wherein said valve member is a ball and said cavity is generally cylindrical.

* * * * *